Jan. 22, 1963   F. L. MOSELEY   3,075,132
SERVOSYSTEM WITH NON-CONTACTING ELECTRICAL TRANSDUCERS
Filed Dec. 1, 1958   2 Sheets-Sheet 1
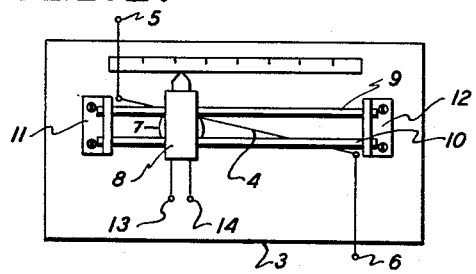
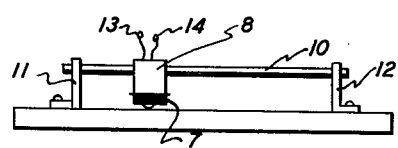
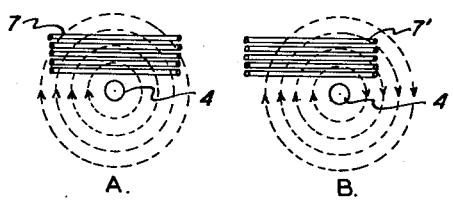
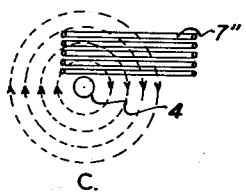
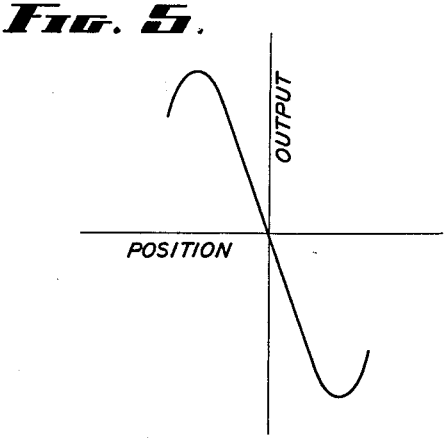
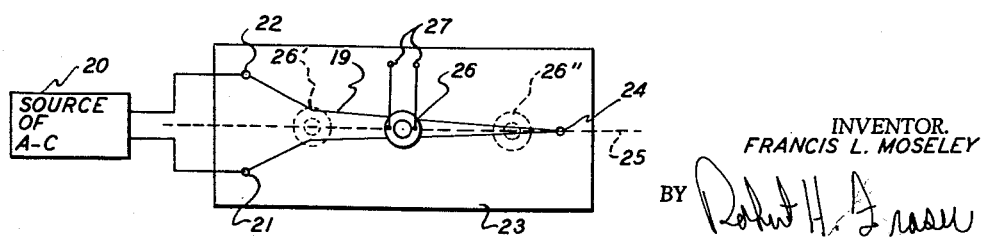
INVENTOR.
FRANCIS L. MOSELEY
BY
ATTORNEY Jan. 22, 1963  F. L. MOSELEY  3,075,132
SERVOSYSTEM WITH NON-CONTACTING ELECTRICAL TRANSDUCERS
Filed Dec. 1, 1958  2 Sheets-Sheet 2
Fig. 7.
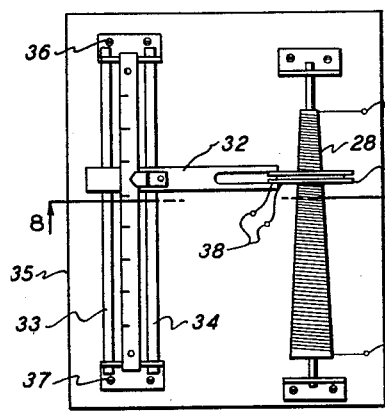
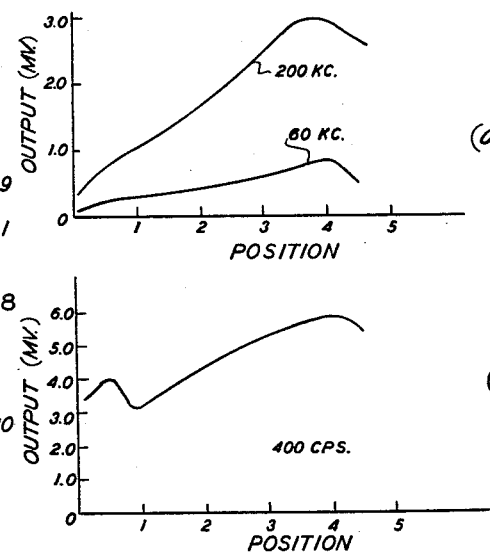
(a)
(b)
Fig. 8.
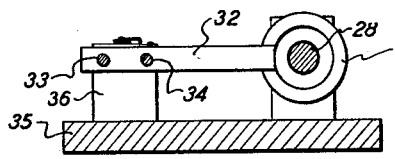
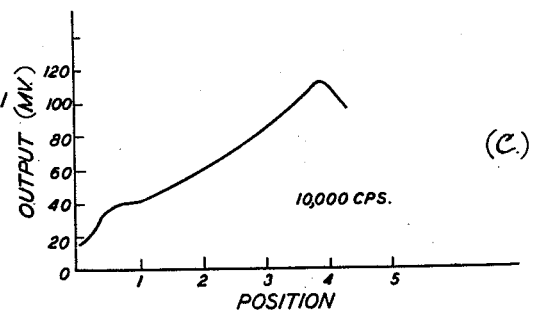
(c)
Fig. 9.
Fig. 10.
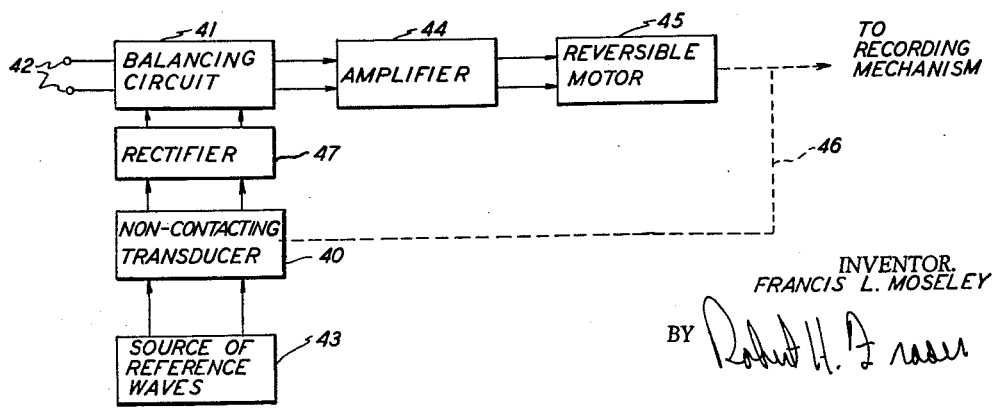
INVENTOR.
FRANCIS L. MOSELEY
BY
ATTORNEY

United States Patent Office 3,075,132
Patented Jan. 22, 1963

3,075,132
SERVOSYSTEM WITH NON-CONTACTING
ELECTRICAL TRANSDUCERS
Francis L. Moseley, Pasadena, Calif., assignor to F. L. Moseley Co., a corporation of California
Filed Dec. 1, 1958, Ser. No. 777,393
10 Claims. (Cl. 318—28)

This invention relates to mechanical-to-electrical transducers, and more particularly to apparatus for providing an electrical signal in accordance with the position of a movable mechanical element.

In generating an electrical signal as a function of the position of a mechanical element, it is well known to employ a potentiometer as a transducer. By linking the contactor of the potentiometer to a movable mechanical element, the position of which is to be sensed, and impressing a voltage across the resistance element of the potentiometer, the voltage taken from the contactor of the potentiometer represents a function of the position of the mechanical element. Such arrangements are frequently employed in servo systems operating on the null balance principle in which a mechanical element is moved in response to an unbalance signal. The mechanical element may be linked to the shaft of a rotary potentiometer across which a standard voltage is impressed, and the voltage taken from the potentiometer contact may be opposed to a variable input signal to reduce the unbalance signal until a state of balance is achieved in the system.

A difficulty encountered in servo systems utilizing a potentiometer is the generation of spurious signals, i.e. noise, by the action of the potentiometer contactor in engaging the resistance element of the potentiometer. Also, the contactor produces mechanical wear in sliding over the resistance element which results in the spurious signals being increased. Frequently, the magnitude of the spurious signals is great enough to mask or distort relatively low level signals and cause an improper operation of the servo system.

In accordance with one aspect of the present invention, a transducer is provided in which an electrical signal is generated as a function of the position of a mechanical element without the use of sliding mechanical contacts. Consequently, the generation of spurious signals of the type described above is substantially eliminated.

In one embodiment of the invention a pickup coil is supported for movement along a fixed traverse relative to an alternating current energized contactor. The contactor and the fixed traverse are oriented so that the mutual coupling between the coil and the contactor varies as a function of the position of the coil along the fixed traverse. As a result, an electrical signal is induced in the pickup coil bearing a functional relationship to the position of the pickup coil along the traverse.

Illustrative arrangements for achieving a variation in mutual coupling as a function of the position of the pickup coil are described below including a canted alternating current energized conductor position in an angular relationship with respect to the fixed traverse of a pickup coil, an alternating current conductor disposed in a V-configuration along the path of the pickup coil, and an alternating current energized conductor wound in a conical helix with a pickup coil being coaxially arranged for movement along the axis of the conical helix.

In a particular application of the invention, a transducer is arranged in a closed loop servo system for generating balancing signals as a function of the position of the pickup coil relative to the alternating current energized conductor. In one arrangement, alternating current balancing signals may be compared with alternating current input signals to derive an electrical signal for rebalancing the servo system.

In another arrangement, alternating current balancing signals from a transducer in accordance with the invention may be converted to unidirectional voltages by means of a rectifier for comparison with unidirectional input signals to generate an error signal for relbalancing the servo system.

A better understanding of the invention may be had from a reading of the following detailed description and an inspection of the drawings, in which:

FIG. 1 is a plan view of a non-contacting transducer in accordance with the invention;

FIG. 2 is an elevational view of the transducer of FIG. 1;

FIG. 3 is a diagrammatic illustration of the manner in which the transducer of FIGS. 1 and 2 may be employed to generate an electrical signal as a function of the position of a pickup coil;

FIG. 4 is a set of diagrammatic illustrations of the relationship between a pickup coil and the magnetic field surrounding an alternating current energized conductor for various positions of the pickup coil;

FIG. 5 is a graph illustrating the relationship between the amplitude and phase of an electrical signal derived from the transducer of FIGS. 1-3 as a function of the position of the pickup coil;

FIG. 6 is a plan view of an alternative arrangement of a non-contacting transducer in accordance with the invention;

FIG. 7 is a plan view of an alternative arrangement of a transducer in accordance with the invention;

FIG. 8 is a sectional view of the transducer of FIG. 7 taken along line 8—8;

FIG. 9 is a set of graphical illustrations of an electrical signal derived from the transducer of FIGS. 7 and 8 as a function of the position of the pickup coil; and FIG. 10 is a block diagram of a servo system incorporating a non-contacting transducer in accordance with the invention.

FIG. 1 shows a transducer including a base 3 on which there is supported a canted electrical conductor 4 which may, if desired be contained within a slot in the base 3. By means of the terminals 5 and 6, alternating current may be pasesd through the conductor 4 which generates a magnetic field. A pickup coil 7 is slidably supported on a block 8 from a pair of rods 9 and 10 which together form a supporting structure by means of which the pickup coil 7 may be moved along a linear fixed traverse relative to the current conductor 4. The rods 9 and 10 may be supported in fixed relationship with respect to the base 3 by means of a pair of end brackets 11 and 12. Due to a transformer action between the conductor 4 and the pickup coil 7, there is induced in the pickup coil 7 a signal which appears at the terminals 13 and 14 bearing a functional relationship to the position of the pickup coil 7 along the fixed traverse.

The operation of the transducer of FIGS. 1 and 2 may be best understood by reference to the diagrammatic illustration of FIG. 3 in which the conductor 4 receives an alternating current reference wave via the terminals 5 and 6 from a source of alternating current 15. The dashed line 16 indicates the fixed traverse along which the pickup coil 7 may be moved by the support mechanism described above in connection with FIGS. 1 and 2. When the pickup coil 7 is centrally disposed with reference to the energized conductor 4, the magnetic fields surrounding the conductor 4 generate signals within the pickup coil 7 which are of opposite phase and tend to cancel. Thus, in FIG. 4A the pickup coil 7 is illustrated symmetrically disposed with respect to the energized conductor 4 with the magnetic field lines at a given instant in time being equally coupled to opposite sides of the coil 7 so that the induced voltages are cancelled.

The phantom representation of a pickup coil 7' in FIG. 3 represents the relationship between the pickup coil 7 and the conductor 4 when the pickup coil 7 is moved along the traverse 16 away from the centrally disposed position. FIG. 4B diagrammatically illustrates the manner in which the magnetic fields of a given instant in time intersect the pickup coil 7'. From FIG. 4B it may be seen that the magnetic field lines are coupled to one side of the pickup coil 7' more than to the other, with the result that a net alternating current signal is induced in the pickup coil having a magnitude bearing a functional relationship to the position with respect to the conductor 4.

Similarly, the phantom illustration of a pickup coil 7" with its corresponding diagrammatic illustration of the magnetic field line surrounding the conductor 4 in a given instant in time is shown in FIG. 4C. FIG. 4C illustrates that in position 7" the pickup coil is linked by magnetic fields from the conductor 4 in a manner which produces a net resultant induced alternating current signal similar to that which is illustrated in FIG. 4B except for being of opposite phase. Accordingly, by positioning the pickup coil 7 along the fixed traverse 16 relative to the canted alternating current energized conductor 4, a signal may be derived from the pickup coil 7 for application to an output circuit 17 which has an amplitude and phase relationship dependent upon the position of the pickup coil 7 along the traverse 16. The traverse 16 shown in dotted lines in FIG. 3 may thus be seen to define a longitudinal axis which lies at a selected angle other than parallel to the longitudinal axis on and along which the length of conductor 4 lies. At different positions along its path of movement, therefore, the pickup coil 7 has different lateral or transverse displacements relative to the closest point or elemental length of the conductor 4.

Where it is desired to derive an alternating current output signal corresponding to the position of a mechanical element, the signal induced in the pickup coil 7 may be applied directly to the output circuit 17. On the other hand, where a unidirectional output signal is desired, the alternating current wave from the pickup coil 7 may be applied to a suitable rectifier and filter circuit to produce an output signal at the terminals 18 as illustrated in FIG. 3.

A graphical illustration of the relationship between the magnitude and polarity of the signal induced in the pickup coil 7 as a function of the position of the pickup coil along the traverse 16 is shown in FIG. 5. As may be seen in FIG. 5, as the pickup coil progresses in either direction from the centrally disposed position, the output signal increases linearly as the conductor departs to one side or the other of the center of the coil until increasing distance begins to cause the output to drop. It is also noted that the phase of the output changes by 180° as the null point at the centrally disposed position is passed by the pickup coil.

In FIG. 6 there is illustrated an alternative arrangement of a non-contacting transducer in accordance with the invention in which an alternating current energized conductor 19 receives an alternating current reference wave from a source 20 via a pair of terminals 21 and 22. The alternating current energized conductor 19 may be supported on a base 23 in a sharp V-configuration, the apex 24 of which is aligned with a dashed line 25 representing a fixed linear traverse of a pickup coil 26. The V-shaped conductor 19 is disposed symmetrically with respect to the traverse 25 so that, as the coil 26 is moved along the traverse 25 as indicated in phantom at 26' and 26", a variation in mutual coupling between the pickup coil and the conductor occurs. It will be appreciated that near the apex 24 of the conductor 19 the magnetic fields produced by the flow of alternating current tend to combine so that the relationship between the pickup coil 26 and the energized conductor 19 tends to approach a condition substantially like that illustrated in FIG. 4A in which the magnetic fields tend to cancel one another and tend to induce in the pickup coil 26 signals of opposite polarity.

In contrast, as the pickup coil 26 is moved along the traverse 25 from the position 26" towards position 26', an increase in mutual coupling occurs in which the magnetic fields surrounding each leg of the V are coupled to opposite sides of the coil 26 in a relationship somewhat similar to that illustrated in FIGS. 4B and 4C, but with the induced signals being additive so that an output signal appears at the terminals 27 bearing a functional relationship to the position of the pickup coil 26 along the traverse 25. There thus appears a change in the lateral displacement between the pickup coil 26 and the conductors as the coil 26 is moved along the longitudinal axis defined by the traverse 25.

However, in contrast to the operation of the transducer of FIGS. 1–3 described above, the arrangement of FIG. 6 produces an alternating current output signal of one phase only but of variable amplitude dependent upon the position of the coil 26, with the null, i.e. zero output signal condition, being adjacent the apex 24.

An arrangement of a tapered coil non-contacting transducer in accordance with the invention is shown in FIGS. 7 and 8 in which an energized conductor 28 is adapted to receive alternating current reference waves from a pair of terminals 29 and 30. The conductor 28 is wound in a helix on a conical form, the axis of which defines the fixed linear traverse of a pickup coil 31. The pickup coil 31 is coaxially supported surrounding the conical helix of the conductor 28 by means of a support block 32 which is slidably mounted on a pair of shafts 33 and 34. The shafts 33 and 34 are held in fixed position on a base 35 by means of the end brackets 36 and 37 so that by movement of the block 32 along the rods 33 and 34, the pickup coil 31 follows a linear traverse about the conical helix of the conductor 28. That is, all elemental lengths of the conductors 28 lie substantially in the surface of a cone or other surface of revolution and along a central axis. The pickup coil 31 moves longitudinally along the central axis of the surface of revolution, but at different longitudinal positions has different lateral or transverse displacements relative to the closest adjacent elemental length of the conductor 28. In this arrangement the conductor 28 lies along, but not on, the central axis.

The output signals which may be derived from a pair of terminals 38 in the arrangement of FIGS. 7 and 8 are similar to those described above in connection with the arrangement of FIG. 6 in which a variation in the coupling between the pickup coil 31 and the conductor 28 produces an output signal of variable amplitude and fixed phase due to the variation in mutual coupling. Thus, when the pickup coil 31 is positioned adjacent the small end of the conical helix of the conductor 28, the coupling between the conductor 28 and the pickup coil 31 is at a minimum with a correspondingly low amplitude signal appearing at the terminals 38.

In contrast, when the pickup coil 31 is moved adjacent the large end of the conical helix, the coupling between the conductor 28 and the pickup coil 31 is at a relatively high value with a resultant large amplitude signal appearing at the terminals 38.

The graphs of FIG. 9 illustrate the variation in the amplitude of the output signal as a function of pickup coil position in the arrangement of FIGS. 7 and 8 for various frequencies of operation. As illustrated in FIG. 9, certain non-linearities may be encountered as the pickup coil is moved along its traverse relative to the alternating current energized conductor. However, such non-linearities are encountered primarily as end effects where the pickup coil is near the end of the traverse so that the central portion of the traverse should be employed where such end effects are objectionable. From the above description of the various arrangements of the invention illustrated in FIGS. 1-3, 6, 7-8, it is apparent that the present invention provides a new and improved non-contacting transducer by means of which an output signal may be derived bearing a functional relationship to the position of a mechanical element. By linking the pickup coil supporting mechanism of the illustrative arrangements to a mechanical movable element, an output signal is provided representing the position of the element.

FIG. 10 illustrates an arrangement in accordance with the invention in which a non-contacting transducer 40 is employed to generate a balancing signal in a servo system of a type which may be employed in a graphical recorder. The non-contacting transducer 40 may comprise any one of the arrangements shown and described above in connection with FIGS. 1-3, 6, 7 and 8. In the servo system of FIG. 10, input signals are applied to a conventional balancing circuit 41 via the terminals 42. In the balancing circuit 41 the input signals are opposed to the signals provided by the non-contacting transducer which is energized from a source of reference waves 43 which may be connected to an alternating current energized conductor in the non-contacting transducer 40 as described in detail above, with signals for application to the balancing circuit 41 being derived from the pickup coil. In a condition of balance of the servo system, the balancing circuit 41 is adapted to provide a substantially zero signal output. However, if the system becomes unbalanced due to a variation in the input signal, the balancing circuit 41 provides a signal which is amplified by an amplifier 44 and applied to a reversible motor 45. The reversible motor 45 drives a mechanical linkage illustrated diagrammatically by the dashed line 46 in a direction in which the non-contacting transducer 40 is repositioned to reduce the output signal from the balancing circuit 41 to zero. As the system approaches a state of balance, the output signal from the balancing circuit 41 approaches zero and when balance is achieved, the motor 45 stops driving the mechanical linkage 46.

In addition to driving the non-contacting transducer 40, the mechanical linkage 46 may be linked to a recording mechanism if desired to provide a graphical record of the character of the input signal applied to the input terminals 42. Where alternating current signals are applied to the terminals 42 and the balancing circuit 41 is arranged to compare an alternating current balancing signal from the non-contacting transducer 40 with the input signal, the output of the non-contacting transducer 40 may be directly applied to the balancing circuit 41 with the rectifier 47 being omitted. However, where unidirectional signals are applied to the terminals 42, the balancing circuit 41 may be connected to receive unidirectional balancing signals derived from the non-contacting transducer 40 via the rectifier and filter 47 illustrated in FIG. 10.

Although specific arrangements of the invention and a particular application of the invention to a servo system have been described above by way of example, it will be appreciated that the invention is not limited thereto. The invention may be used to advantage in any application where it is necessary to translate the position of a mechanical element into an electrical quantity with a minimum of spurious signals being generated by the transducer and without mechanical wear from sliding contactors. Accordingly, any and all modifications, variations or equivalent arrangements falling within the scope of the annexed claims should be considered to be a part of the invention.

What is claimed is:

1. A transducer for generating an electrical signal as a function of the position of a mechanical element including the combination of a stationary alternating current energized conductor disposed in selected relation to a selected longitudinal axis, a pickup coil, and a positioning mechanism for supporting the pickup coil along a fixed longitudinal path which is variably laterally displaced relative to the alternating current energized conductor to produce a substantially linear change in the resultant mutual coupling between the conductor and the pickup coil whereby an electrical signal is induced in the pickup coil from the alternating current energized conductor having an amplitude which is a function of the position of the pickup coil along the fixed longitudinal path.

2. A transducer for generating an electrical signal as a substantially linear function of the position of a mechanical element including the combination of a mechanical element supported for movement along a fixed longitudinal path, a pickup coil supported on the mechanical element and an alternating current energized conductor disposed along a selected fixed axis having a selected disposition relative to the fixed longitudinal path such that at different positions along the longitudinal path the pickup coil lies at different transverse distances from the closest elemental lengths of the conductor, whereby a substantially linearly changing electrical signal is induced in the pickup coil as a function of the position of the mechanical element along the fixed longitudinal path.

3. A transducer for generating an electrical signal as a function of the position of a mechanical element including the combination of a pickup coil mounted for movement along a fixed linear traverse, and an alternating current energized conductor lying on a longitudinal axis which is angularly disposed in fixed relationship with respect to the fixed traverse whereby an electrical signal is induced in the pickup coil having an amplitude which is a function of the position of the pickup coil along the traverse.

4. A transducer for generating an electrical signal as a function of the position of a mechanical element including the combination of a pickup coil, a supporting mechanism for the pickup coil for confining its movement to a fixed linear traverse, an alternating current energized conductor disposed along an axis lying in a canted angular position with respect to the linear traverse so that the pickup coil may be moved from a centrally disposed position with respect to the conductor to a laterally displaced position on either side of the conductor whereby an electrical signal is induced in the pickup coil having an amplitude and phase determined by the position of the pickup coil with respect to the alternating current energized conductor.

5. A transducer for generating electrical signals as a function of the position of a mechanical element including the combination of a pickup coil supported for movement along a fixed linear traverse, an alternating current energized conductor disposed in a V-shaped configuration along said traverse with the apex of the V being disposed adjacent one end of the traverse and the open end of the V being disposed adjacent the other end of the traverse whereby an alternating current signal is induced in the pickup coil having an amplitude which is a function of the position of the pickup coil along the fixed traverse.

6. A transducer for generating an electrical signal in accordance with the position of a mechanical element including the combination of an alternating current energized conductor arranged in the form of a conical helix, a pickup coil coaxially disposed with respect to the alternating current energized conductor, a support mechanism for transporting the pickup coil along a fixed linear traverse defined by the axis of the conical helix whereby an alternating current signal is induced in the pickup coil as a function of the position of the pickup coil along said traverse.

7. A transducer for generating an electrical signal as a function of the position of a mechanical element including the combination of an alternating current energized conductor, a pickup coil, a mechanical support mechanism for positioning the pickup coil, the mechanism defining a longitudinal traverse disposed at an angle other than parallel to the conductor, the traverse having a fixed relationship with respect to the alternating current energized conductor so that the coupling between the alternating current conductor and the pickup coil is varied as a function of the position of the pickup coil along the traverse whereby an alternating current signal is induced in the pickup coil having an amplitude determined by the degree of coupling and the position of the pickup coil along the fixed traverse.

8. A balancing element for use in a closed loop servo system including the combination of a source of alternating current, a pickup coil, a fixed electrical conductor connected to the source of alternating current, a support mechanism for the pickup coil adapted to transport the pickup coil along a fixed longitudinal path relative to the electrical conductor, the longitudinal path lying at an angle relative to the electrical conductor, means linking the support mechanism to the servo system for positioning the pickup coil along the fixed longitudinal path, and a balancing circuit coupled to the pickup coil in which an electrical signal derived from the pickup coil bears a functional relationship to the position of the pickup coil along the fixed longitudinal path.

9. A balancing element for use in connection with a servo system including the combination of a reference source of alternating current waves, a conductor connected to the source of reference waves, a pickup coil supported for movement along a fixed traverse having varying lateral displacement relative to the conductor for deriving an alternating current signal bearing a functional relationship to the lateral position of the pickup coil relative to the conductor, means for positioning the pickup coil along the fixed traverse, and means coupled to the pickup coil for deriving a balancing signal corresponding to the derived alternating current signal.

10. Apparatus in accordance with claim 9 including a balancing circuit for receiving unidirectional voltages and in which said means for deriving a balancing signal comprises at least one rectifier connected between the pickup coil and an output circuit.

References Cited in the file of this patent

UNITED STATES PATENTS

| | | |
|---|---|---|
| 1,727,932 | Medved | Sept. 10, 1929 |
| 2,450,084 | Emerson | Sept. 28, 1948 |
| 2,507,763 | Caine | Mar. 16, 1950 |
| 2,629,620 | Berry | May 25, 1954 |
| 2,684,462 | Tyzzer | July 20, 1954 |
| 2,825,859 | Quade | Mar. 4, 1958 |
| 2,835,856 | Moseley | May 20, 1958 |
| 2,835,858 | Moseley | May 20, 1958 |
| 2,848,632 | Keene | Aug. 19, 1958 |
| 2,860,293 | Salmonovick | Nov. 11, 1958 |
| 2,915,722 | Foster | Dec. 1, 1959 |
| 2,924,798 | Foster | Feb. 9, 1960 |
| 2,946,939 | Lind | July 26, 1960 |

OTHER REFERENCES

Ahrendt, W. R.: Servomechanism Practice, page 3, McGraw-Hill, New York, 1954.